United States Patent [19]

Brahms

[11] Patent Number: 4,849,850
[45] Date of Patent: Jul. 18, 1989

[54] CIRCUIT FOR PROTECTING ELECTRONIC DEVICES AGAINST OVERLOAD

[75] Inventor: Martin Brahms, Hanover, Fed. Rep. of Germany

[73] Assignee: Kabelmetal Electro Gesellschaft mit beschränkter Haftung, Hanover, Fed. Rep. of Germany

[21] Appl. No.: 132,245

[22] Filed: Dec. 14, 1987

[30] Foreign Application Priority Data

Dec. 13, 1986 [DE] Fed. Rep. of Germany ....... 3642624

[51] Int. Cl.4 ..................... H04M 19/00; H02H 3/027
[52] U.S. Cl. ................................ 361/101; 330/207 P; 330/298; 361/93
[58] Field of Search .................... 361/87, 93, 100, 101, 361/71; 330/207 P, 298; 379/2, 27, 381, 412; 207/248, 570, 571

[56] References Cited

U.S. PATENT DOCUMENTS 4,430,682 2/1984 Babsch ........................... 361/101 X
4,709,160 11/1987 Kinoshita ........................ 361/93 X
4,718,084 1/1988 Dragotin ........................... 379/412

Primary Examiner—Derek S. Jennings

[57] ABSTRACT

A circuit for protecting electronic devices which are fed from a source of dc voltage and to which a subscriber's line (ASL) is connected. In order to limit the current in the event of an overload on the subscriber's line (ASL), a MOSFET (T1) is provided as current-limiting component. The MOSFET (T1) is disconnected and re-connected periodically by means of a relaxation generator (K) when the MOSFET is in its current-limiting condition. Upon the normal operation of the circuit, the relaxation generator (K) does not operate. By proper dimensioning thereof, the time for which the MOSFET (T1) is blocked can be roughly adjusted as compared with the time in which it acts as current limiter. In this way, too great a heating of the MOSFET (T1) is avoided.

7 Claims, 3 Drawing Sheets

CIRCUIT FOR PROTECTING ELECTRONIC DEVICES AGAINST OVERLOAD

FIELD AND BACKGROUND OF THE INVENTION

The present invention relates to a circuit for the protection against overload of an electronic device which is fed from a source of dc voltage and is arranged at the starting or terminating of a connecting line over which communication signals are transmitted in the form of digital signals.

An "overloading" of the device within the meaning of the invention can result if too high a current flows for any reason. This may occur, for instance, in the event of a short circuit on the connecting line. A circuit is required for protection against overload upon every transmission by line of a signal when signals are digitalized or transmitted in pulse form. One known method of transmission is, for instance, the PCM2 method employed by the German Federal Post Office in which two spatially adjacent participants in the public communications network are together connected over a subscriber's line to a central office. The letters "PCM" stand for the well-known method of pulse code modulation by which communication signals are transmitted as digital signals. In the following this PCM2 method will be considered to be representative of all possible methods.

In the PCM2 method the analog signals are digitalized in the central office by suitable electronic circuits and sent out over the subscriber's line. At the end of the subscriber's line there is installed a device having an electronic circuit by which the incoming digital signals are converted back into analog signals. This is true also of the other direction. For the operation of the active elements of the electronic circuits there is provided in the central office a central current supply which supplies a dc voltage of, for instance, 95 V. For example, ten PCM devices which have these circuits and are all of the same construction are connected to this current supply, subscribers lines extending from each of them to, in each case, two subscribers. If a short-circuit occurs, for instance, on one of the devices, the supply of current can be interrupted, as a result of which not only the device concerned but also all the other devices drop out.

It is an object of the invention to provide a circuit for a system having a plurality of electronic devices connected to a common current supply by which assurance is had that in the case of an overload on a line which is connected to one device there will be no impairment of the other devices.

SUMMARY OF THE INVENTION

Accordingly, the invention provides that between the source of dc voltage (UB) and the subscriber's line (ASL) there is connected, in series with an ohmic resistance (RI), an active current-limiting component (4) the current rating of which is adjustable as a function of the voltage drop on the resistor (R1); and to the current-limiting component (4) there is connected a relaxation generator (K) by which the component (4), in the event of an overload on the subscriber's line, can be disconnected periodically for an adjustable period of time and then connected again.

With this circuit, an overload which occurs on a subscriber's line, for instance a short circuit, is blocked off in that device. The supply voltage in this case drops off almost completely on the current-limiting component. The central current supply remains unaffected by the overload as do all other connected devices.

Another advantage of this circuit resides in the use of the relaxation generator. In the event of an overload, a current which to be sure is increased but limited is not prevented but it is restricted to a very short period of time. The individual active elements of the circuit can therefore not heat up substantially. This is true, in particular, of the current-limiting component, which is preferably as a MOSFET. Special measures for the removal of heat are therefore unnecessary. The continuous reconnecting by the relaxation generator is also advantageous so that brief disturbances do not make themselves perceptible for the operation of the circuit. The time during which an increased current flows can be adjusted in proportion to the time during which no current flows in simple fashion by the suitable dimensioning of the relaxation generator.

According to a feature of the invention, the current-limiting component (4) contains a transistor (T1) to the control electrode of which the output of the relaxation voltage generator (K) is connected via a diode (D3).

Still further according to the invention, the output of an operational amplifier (OP1) is connected to the control electrode of the transistor (T1), the one input (01) of said operational amplifier being connected to a voltage divider (R2, R3, R4) which is connected in parallel to the source of dc voltage (UB), while the other input (02) is connected between the transistor (T1) and the ohmic resistor (R1) which is in series with same.

Yet further, the one input (E1) of the relaxation generator (K) is connected to the current-limiting component (4).

The invention also provides that the relaxation generator (K) contains an operational amplifier (OP2) the output of which is connected, via a diode (D3), to the control electrode of the transistor (T1) whose one input (103) is connected to the voltage divider (R2, R3, R4) which lies in parallel to the source of dc voltage (UB) while its other input (04) is connected, via a diode (D1), to the current-limiting component (4) and, via a capacitor (C), to one pole of the source of dc voltage (UB), and in which said other input (04) and the output are connected to each other, on the one hand, via the series connection of a diode (D2) and a resistor (R7) and, on the other hand, in a parallel branch via a resistor (8).

It is advantageous to form the transistor (T1) as a MOSFET.

It is also advantageous to form the transistor (T1) as a bipolar transistor.

Also, the transistor (T1) can be formed as a field-effect transistor.

BRIEF DESCRIPTION OF THE DRAWINGS

With the above and other objects and advantages in view, the present invention will become more clearly understood in connection with the detailed description of a preferred embodiment, when considered with the accompanying drawing, of which.

DETAILED DESCRIPTION OF THE PREFERRED EMBODIMENT

Figure 1:
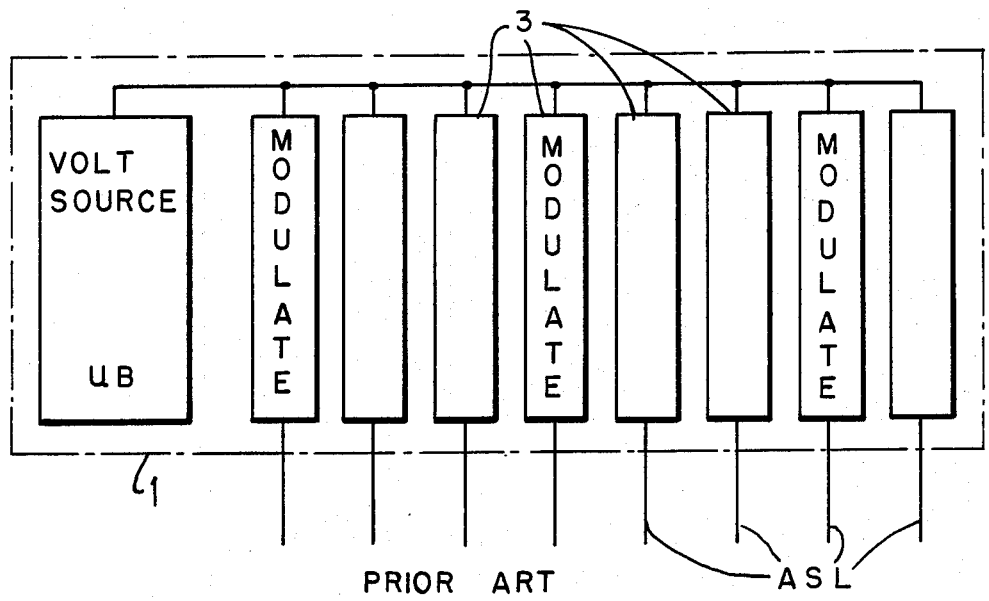
FIG. 1 is a section of a "central office" shown diagrammatically.

In FIG. 1, a "central office" 1 of the public communication network is indicated by a dash-dot line. This central office includes a source of dc voltage UB which supplies a constant dc voltage of, for instance, 95 V, which varies by at most 2 volts. In the embodiment shown, eight PCM2 devices 3 are connected in parallel with each other to the source of dc voltage UB. From each PCM2 device 3 a subscriber's line ASL goes to in each case two subscribers who can also telephone simultaneously by digital transmission.

Figure 2:
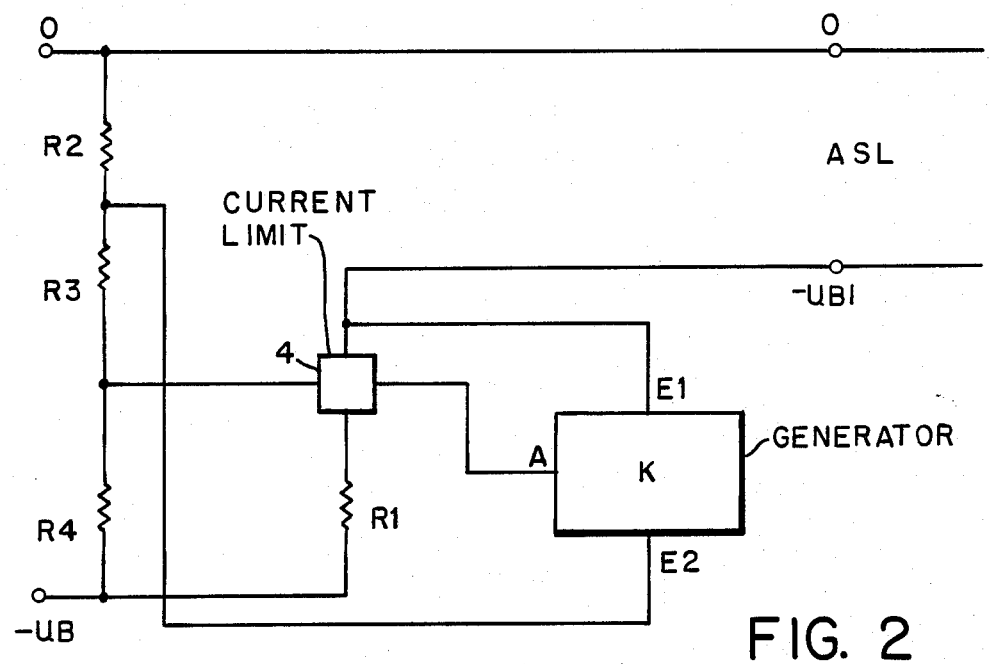
FIG. 2 is a circuit according to the invention, shown on a larger scale.

In each of the PCM2 devices 3 there is contained, for instance, a circuit in accordance with in FIG. 2. It has an active current-limiting component 4 which lies in series with an ohmic resistor R1. The word "component" has been selected for the sake of brevity. It includes a complete electronic circuit by which a controlled limiting of current can be carried out. The component 4 is connected to the source of dc voltage UB via a voltage divider, consisting of the resistors R2, R3 and R4, which is in parallel to said source of dc voltage UB. The feed voltage UB1 is connected to the subscriber's line ASL, it corresponding, except for a slight drop on the resistor R1 and on the component R4, to the voltage of the source of dc voltage UB.

To the subscriber's line ASL there is connected a relaxation generator K having an input E1. An input E2 of the relaxation generator K is connected, via the voltage divider formed by the resistors R2, R3 and R4, to the source of dc voltage UB, the input E2 being connected between the resistors R2 and R3. The output A of the relaxation voltage generator K is connected to the current-limiting component 4.

The circuit of FIG. 2 operates as follows:

In the case of disturbance-free operation the component 4 passes current. The feed voltage UB1 then corresponds, except for a slight voltage drop over the resistor R1 and the component R4, to the operating voltage which is supplied by the source of dc voltage UB of the central office 1. Upon an overload on the subscriber's line ASL, for instance a short circuit, an increased current flows over the component 4. In this case, the circuit limits the current flowing over the component 4. Due to the heating of the component 4 which takes place in the connection, this must not continue for too long. This is taken care of by the relaxation generator K, which does not operate in the event of normal operation. No influencing of the current-limiting component 4 then takes place. In the event of overload, an increased voltage drop is obtained over the component 4 because of its current-limiting action, so that the relaxation generator K begins to operate. It provides, at its output A, a relaxation voltage by which the component part 4 is now, i.e. under overload, periodically blocked. This manner of operation of the relaxation generator K is explained more fully below with reference to FIGS. 3 and 4. When the overload is eliminated, the voltage drop on the component 4 becomes slight and the relaxation generator K no longer operates. The circuit then has normal operation again.

Figure 3:
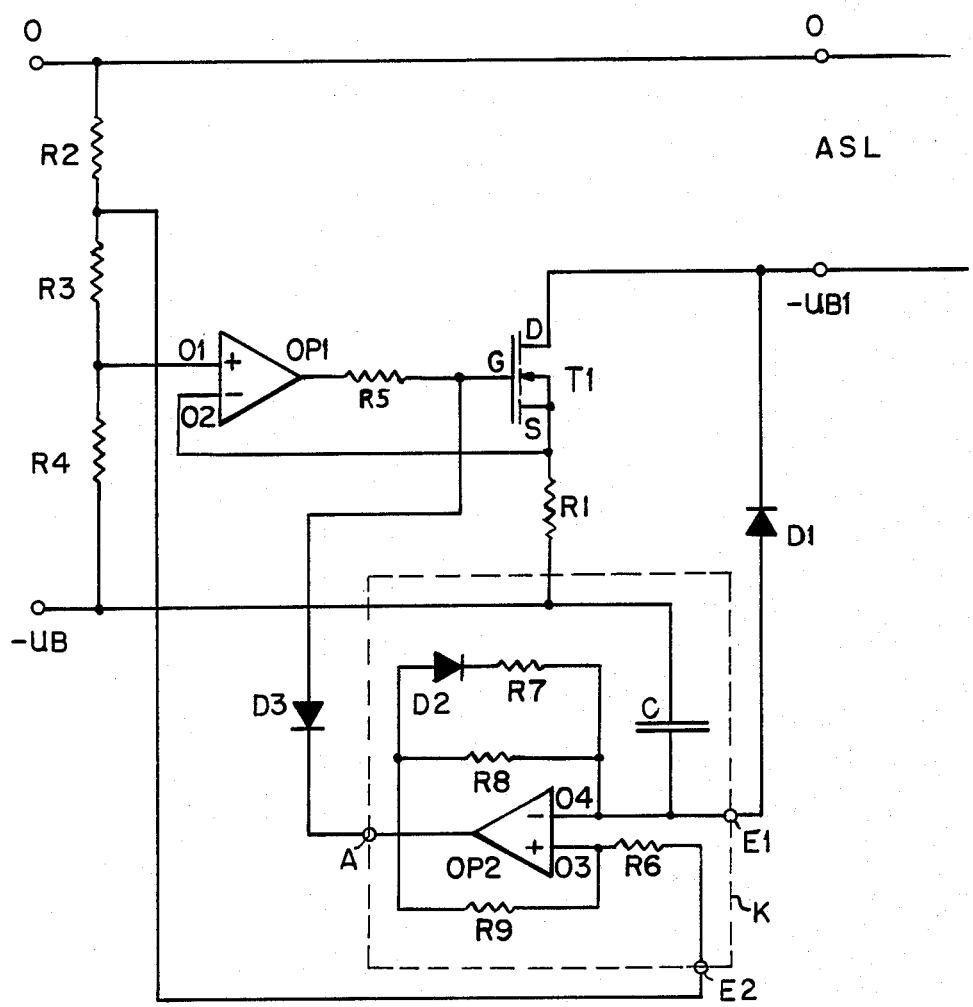
FIG. 3 is a circuit which has been supplemented as compared with FIG. 2.

The current-limiting component 4 can be a bipolar transistor. However, a field-effect transistor can also be used. In the preferred embodiment, the component 4 is a MOSFET, as shown in FIG. 3.

Figure 4:
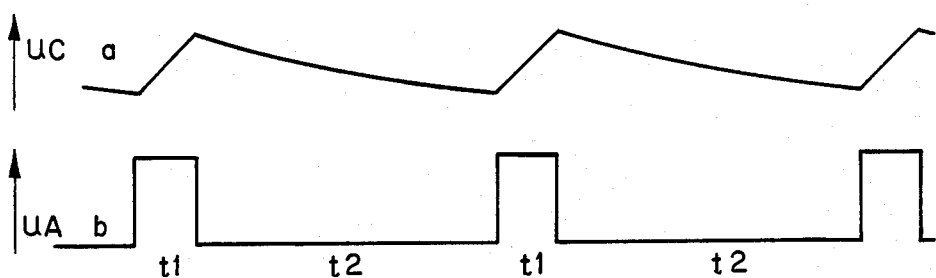
FIG. 4 are waveforms showing the course of the voltage at the input and output of the relaxation voltage generator shown in FIG. 3.

The circuit of the invention will be explained below with reference to FIGS. 3 and 4, the same parts as in FIG. 2 being provided with the same reference numbers.

The current-limiting component 4 in this embodiment is a MOSFET T1 the current path of which is in series with the ohmic resistor R1. The resistor R1 is connected on the other side to the same pole of the source of dc voltage UB as the resistor R4. Between the drain electrode of the MOSFET T1 and the other pole of the source of dc voltage UB the operating voltage UB1 for the subscriber's line ASL is connected. Between the resistors R3 and R4 there is connected an input 01 of an operational amplifier OP1. The output of the operational amplifier OP1 is connected via a resistor R5 to the gate electrode G of the MOSFET T1. The second input 02 of the operational amplifier OP1 is connected to the current path between the MOSFET T1 and the resistor R1. In the normal case, the voltage at the input 01 of the operational amplifier OP1 is greater than the voltage at the input 02. The MOSFET T1 then passes fully the current.

When an overload occurs on a subscriber's line ASL, for instance a short circuit, an increased current flows over the MOSFET T1. The result is that there is an increased voltage drop over the resistor R1. As a result, the voltage at the input 02 of the operational amplifier OP1 increases, so that its output voltage drops. The MOSFET T1 therefore becomes highly ohmic so that only a limited current can flow over it, which current is so slight that no reaction can take place on the source of dc voltage UB. The current, for instance, should not be higher than 60 mA.

In the more highly ohmic state the current-limiting MOSFET T1 heats up. It then gives off, for instance, a power of 6 watts. Without additional measures, the circuit and thus the corresponding device would rapidly heat up. It would then be necessary to use expensive cooling means for each individual device. This is not necessary in the present case as a result of the use of the relaxation generator K described in the following.

The relaxation generator K provides at its output A, for instance, pulse-shaped voltage UA in accordance with FIG. 4b, by which the MOSFET T1 is held in its current-limiting condition only for a relatively short period of time. In a period of time which is not longer than this short time, the MOSFET T1 is blocked. No current then flows any longer over the MOSFET T1 (except for a negligible leakage current), so that the MOSFET T1, as a whole, is not substantially heated.

Within the relaxation generator K there is contained an operational amplifier OP2 whose output forms the output A of the relaxation generator K. The one input 03 of the operational amplifier OP2 is connected, via an ohmic resistor R6, between the resistors R2 and R3 to the voltage divider R2/R3/R4, while the other input 04 is connected via a diode D1 to the drain electrode D of the MOSFET T1. To the input 04 of the operational amplifier OP2 there is furthermore connected a capacitor C which is connected on the other side to a pole of the source of dc voltage UB. The input 04 and the output of the operational amplifier OP2 are connected to each other, on the one hand, via the series connection of a diode D2 and an ohmic resistor R7 and, on the other hand, in a parallel branch via an ohmic resistor R8. The value of the resistor R7 is in the present case small as compared with that of the resistor R8.

The relaxation generator K is connected via the diode D1 to the drain electrode D of the MOSFET T1. The diode D1 conducts during the normal operation of the circuit so that a high voltage is present at the output A of the relaxation generator K. The diode D3 which is connected between the output A of the relaxation voltage generator K and the control electrode of the MOSFET T1 is then blocked. In this case, the MOSFET T1 is operative for its task of limiting the current. It can therefore be low ohmic with full passage of current or high ohmic in its limiting function.

If the voltage drop over the MOSFET T1 increases because of an overload, the diode D1 is blocked. The relaxation generator K then starts to operate. The voltage at its output A drops and the diode D3 passes current. The MOSFET T1 is thereby completely blocked. It oscillates between the two conditions "blocked" and "current limiting," corresponding to the course of the voltage UA (FIG. 4b) at the output of the relaxation generator K. The course of the voltage UA corresponds to the course of the voltage UC at the input E1 of the relaxation generator K. This course is produced as follows:

As long as the diode D1 passes current, a lower potential is present at the input 04 of the operational amplifier OP2 than at the input 03 thereof. The potential at the input 03 depends on a voltage divider comprising the resistors R6 and R9. The input 03 is connected to the voltage divider between the resistors R6 and R9. The voltage divider itself is connected to the output of the operational amplifier OP2 via resistor R9 and to the input E2 of the relaxation generator K via resistor R6. The potential of the input E2 of the relaxation generator K corresponds to the voltage tapped off between the resistors R2 and R3. During each phase in the operation of the circuit this voltage remains constant, within a permissible range of the variation of the source of dc voltage UB. A positive potential is then present at the output of the operational amplifier OP2. The diode D3 is blocked and does not affect the MOSFET T1.

In case of overload, an increased voltage drop is obtained over the MOSFET T1. The diode D1 is thereby blocked so that the relaxation generator K begins to operate. After the blocking of the diode D1, the capacitor C is charged via the resistors R7 and R8. The voltage UC of the capacitor C increases in accordance with FIG. 4a. The charging takes place until the potential at the input 04 of the operational amplifier OP2 is greater than that at the input 03. High potential is present at the output of the operational amplifier OP2 for a period of time t1 (FIG. 4b) during which interval the diode D3 remains blocked.

Figure 5:
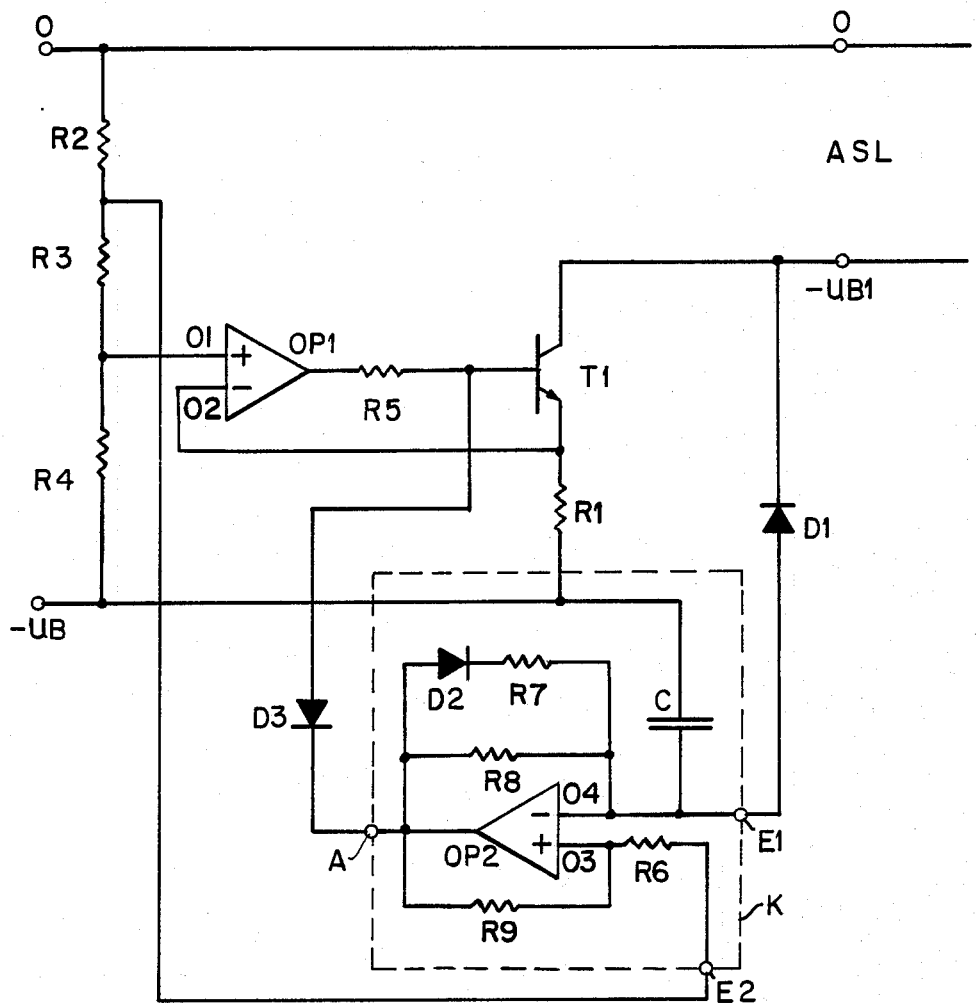
FIG. 5 shows an alternative embodiment of the circuit of FIG. 3 employing a bipolar transistor in lieu of a field-effect transistor.

FIG. 5 shows the same circuit as FIG. 3 except that the transistor T1 is shown as a bipolar transistor in FIG. 5 instead of the field effect transistor of FIG. 3.

If the potential at the input 04 of the operational amplifier OP2 becomes greater than that at the input 03 then the operational amplifier OP2 switches. A lower potential is present at its output, the diode D3 becomes conductive and the MOSFET T1 is blocked. The capacitor C is now discharged over the resistor R8 with the course of voltage shown in FIG. 4a. During the discharge time t2 (FIG. 4b), low potential is present at the output of the operational amplifier OP2 and the MOSFET T1 remains blocked for the entire time. After discharge of the capacitor C, the operational OP2 moves back into its initial position with the high potential at the output, so that the MOSFET T1 is again brought into its current-limiting state.

The times t1 and t2 can be in a ratio of, for instance, 1:5 to 1:10. This ratio can easily be set by suitable selection of the resistors R7 and R8. The resistor R7 should be small value as compared with the resistor R8 so that the capacitor C can be rapidly charged. The shorter time required for this determines the current-limiting time of the MOSFET T1 with less time for heating. The discharge of the capacitor C takes place, due to the diode D2, only over the resistor R8. If it is desired, for any reason, for the time t1 to be longer than the time t2, it is merely necessary to reverse the polarity of the diode D2.

Instead of the "double" voltage divider consisting of the three resistors R2, R3 and R4, in principle two separate voltage dividers can also be connected, in parallel to each other, to the source of dc voltage UB. One of them is then provided for the operational amplifier OP1 while the operational amplifier OP2 is connected to the other.

I claim:

1. In a system for communicating digital signals over subscriber lines, and having an electronic device for regulating current on a subscriber line, and wherein the electronic device comprises an active current-limiting component fed from a source of dc voltage, the electronic device being located at a starting or a terminating portion of a connecting subscriber line over which the digital communication signals are transmitted, a protection circuit for protecting the electronic device against overload comprising a resistor serially connected with an active current-limiting component between the source of dc voltage and a subscriber line, current rating of the current-limiting component being adjustable as a function of a voltage drop across the resistor;

a relaxation generator connected to the current-limiting component for acting, in the event of an overload on the subscriber line, to deactivate and reactivate the current-limiting component periodically for an adjustable period of time; and a diode; and wherein the current-limiting component comprises a transistor having a control electrode connected via said diode to an output of the relaxation generator.

2. A protection circuit according to claim 1, further comprising
   an operational amplifier having an output connected to the control electrode of the transistor; and
   a voltage divider connected in parallel to the source of dc voltage, the voltage divider outputting a voltage to a first input of said operational amplifier, a second input of the operational amplifier being connected to a junction between the transistor and said resistor.

3. A protection circuit according to claim 1 wherein an input of the relaxation generator is connected to a junction between the current-limiting component and the subscriber line.

4. A protection circuit according to claim 1, wherein the relaxation generator comprises an operational amplifier having an output connected via said diode to the control electrode of said transistor; said protection circuit further comprising a voltage divider connected in parallel to the source of dc voltage, a second diode, a third diode, a capacitor, a second resistor and a third resistor; and wherein a first input of the operational amplifier is connected to an output of the voltage divider;

a second input of the operational amplifier is connected via said second diode to a junction between the current-limiting component and the subscriber line, the second input of the operational amplifier is connected further, via said capacitor, to one pole of the source of dc voltage; and the second input of the operational amplifier and an output of the operational amplifier are connected to each other via a series connection of said third diode and said second resistor and, also in a parallel branch, via said third resistor.

5. A protection circuit according to claim 1, wherein the transistor is formed as a MOSFET.

6. A protection circuit according to claim 1, wherein the transistor is formed as a bipolar transistor.

7. A protection circuit according to claim 1, wherein the transistor is formed as a field-effect transistor.

* * * * *